(12) United States Patent
Hikita

(10) Patent No.: US 11,198,332 B2
(45) Date of Patent: Dec. 14, 2021

(54) TIRE AND TIRE SET

(71) Applicant: SUMITOMO RUBBER INDUSTRIES, LTD., Hyogo (JP)

(72) Inventor: Masahiro Hikita, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 443 days.

(21) Appl. No.: 16/204,456

(22) Filed: Nov. 29, 2018

(65) Prior Publication Data

US 2019/0184757 A1    Jun. 20, 2019

(30) Foreign Application Priority Data

Dec. 19, 2017   (JP) ............................. JP2017-242954

(51) Int. Cl.
| B60C 11/01 | (2006.01) |
| B60C 11/11 | (2006.01) |
| B60C 19/00 | (2006.01) |
| B60C 11/13 | (2006.01) |
| B60C 11/00 | (2006.01) |

(52) U.S. Cl.
CPC ............. B60C 11/11 (2013.01); B60C 11/13 (2013.01); B60C 19/001 (2013.01); *B60C 11/0083* (2013.01); *B60C 11/01* (2013.01); *B60C 2200/10* (2013.01); *B60C 2200/14* (2013.01)

(58) Field of Classification Search
CPC ........ B60C 11/01; B60C 11/11; B60C 19/001
See application file for complete search history.

(56) References Cited

U.S. PATENT DOCUMENTS

| 5,681,141 A | * | 10/1997 | Critel | .................... | B65G 57/28 |
| | | | | | 414/789.2 |
| 2011/0290390 A1 | * | 12/2011 | Matsumura | ......... | B60C 11/0083 |
| | | | | | 152/209.11 |
| 2012/0024440 A1 | * | 2/2012 | Ishida | .................... | B60C 11/11 |
| | | | | | 152/209.1 |

FOREIGN PATENT DOCUMENTS

| GB | 2005200 A | * | 4/1979 |
| JP | 2009-292428 A | | 12/2009 |

OTHER PUBLICATIONS

SP3765: A stack of tractor tyres, four pages, Jul. 2009 (Year: 2009).*

* cited by examiner

*Primary Examiner* — Steven D Maki
(74) *Attorney, Agent, or Firm* — Greenblum & Bernstein, P.L.C.

(57) ABSTRACT

A tyre includes a tread portion provided with blocks each protruding toward a ground contact surface thereof from a tread bottom surface, and axially spaced side portions each extending from the tread portion to a respective bead portion. The blocks include shoulder blocks spaced. The shoulder blocks each include an overhanging portion located axially outside the corresponding side portion. The overhanging portion includes a pair of first walls extending in substantially parallel with a tyre meridian cross-section. The shoulder blocks have shoulder block lengths which are lengths in the tyre circumferential direction measured between the pair of first walls along the ground contact surface, wherein the shoulder block lengths are shorter than gap lengths which are lengths in the tyre circumferential direction measured on the tread bottom surface between adjacent shoulder blocks.

16 Claims, 5 Drawing Sheets

TIRE AND TIRE SET

BACKGROUND ART

Field of the Disclosure

The present disclosure relates to a tyre having a tread portion provided with a plurality of blocks.

Description of the Related Art

Conventionally, when tyres are carried or stocked, these tyres are typically stacked up and down such that the tyre axes are vertical. The following Patent document 1 discloses a tyre with side portions which comprise one of the side portions provided with a recess and the other one of the side portions provided with a protrusion in order to suppress the collapse of tyres stacked up and down.

PATENT DOCUMENT

[Patent Document 1]
Japanese Unexamined Patent Application Publication 2009-292428

SUMMARY OF THE DISCLOSURE

For example, tyres which are suitable for traveling on rough terrain include tread portions provided with blocks, and the blocks include shoulder blocks, on the respective tread edge sides, protruding axially outwardly beyond the side portions. In such tyres, unfortunately, the side portions of the respective tyres are not in contact with each other when the tyres are stacked up and down such that the tyre axes are vertical. Therefore, even though the recess and the corresponding protrusion are provided on the side portions as disclosed in Patent document 1, it has been difficult to suppress collapse of stacked tyres.

In view of the above problems in the conventional art, the present disclosure has a primary object to provide a tyre, which includes shoulder blocks protruding axially outwardly of the side portions, capable of suppressing collapse when it is stacked up and down.

According to one aspect of the disclosure, a tyre includes a tread portion provided with blocks each protruding toward a ground contact surface thereof from a tread bottom surface, and axially spaced side portions extending from the tread portion to bead portions, the blocks including a pair of rows of shoulder blocks spaced in a tyre circumferential direction, each row being arranged on a respective one of tread edges. In each row, the shoulder blocks each include an overhanging portion located axially outside the corresponding side portion. The overhanging portion includes a pair of first walls extending in substantially parallel with a tyre meridian cross-section, and the shoulder blocks have shoulder block lengths which are lengths in the tyre circumferential direction measured between the pair of first walls along the ground contact surface, wherein the shoulder block lengths are shorter than gap lengths which are lengths in the tyre circumferential direction measured on the tread bottom surface between adjacent shoulder blocks.

In another aspect of the disclosure, the ground contact surface of each shoulder block may be a trapezoidal shape.

In another aspect of the disclosure, each first wall may be a triangular shape.

In another aspect of the disclosure, each first wall may have an angle within 5 degrees with respect to the tyre meridian cross-section.

In another aspect of the disclosure, the shoulder block lengths may be in a range of from 90% to 98% of the gap lengths.

In another aspect of the disclosure, in each shoulder block, the overhanging portion may have an axially overhang length of from 10% to 20% of a tread width measured between the tread edges in the tyre axial direction.

In another aspect of the disclosure, the blocks may further include a pair of rows of middle blocks spaced in a tyre circumferential direction and arranged axially inside the pair of rows of the shoulder blocks, wherein in axially adjacent rows of the shoulder blocks and the middle blocks, the shoulder blocks and the middle blocks may be arranged alternately in the tyre circumferential direction, the middle blocks may have middle-end positions located axially outermost on the tread bottom surface, and axial middle-end distances from the middle-end positions to the tread edge located axially outwardly of the middle-end positions may be longer than shoulder block heights at the middle-end positions.

In another aspect of the disclosure, in each row of the shoulder blocks, the shoulder blocks may have shoulder-end portions located axially outermost on the tread bottom surface, and shoulder distances from the shoulder-end portions to the corresponding tread edge measured along side surfaces of the shoulder blocks may be shorter than bottom distances from the middle-end positions to the shoulder-end portions measured on the tread bottom surface.

In another aspect of the disclosure, the shoulder distances may be in a range of from 80% to 95% of the bottom distances.

In another aspect of the disclosure, a tyre set includes a first tyre and a second tyre each having the above feature, when the first tyre is stacked on the second tyre such that one of the side portions of the first tyre lies on one of the side portions of the second tyre, the respective shoulder blocks of the first tyre are positioned into the respective gaps between adjacent shoulder blocks of the second tyre.

In another aspect of the disclosure, a tyre set includes a first tyre and a second tyre each having the above feature, when the first tyre is stacked on the second tyre such that one of the side portions of the first tyre lies on one of the side portions of the second tyre, the respective shoulder blocks of the first tyre are positioned into the respective gaps between adjacent shoulder blocks of the second tyre, and the respective shoulder blocks of the first tyre are positioned apart from the respective middle blocks of the second tyre in the tyre axial direction.

DESCRIPTION OF THE PREFERRED EMBODIMENTS

An embodiment of the present disclosure will be explained below with reference to the accompanying drawings.

Figure 1:
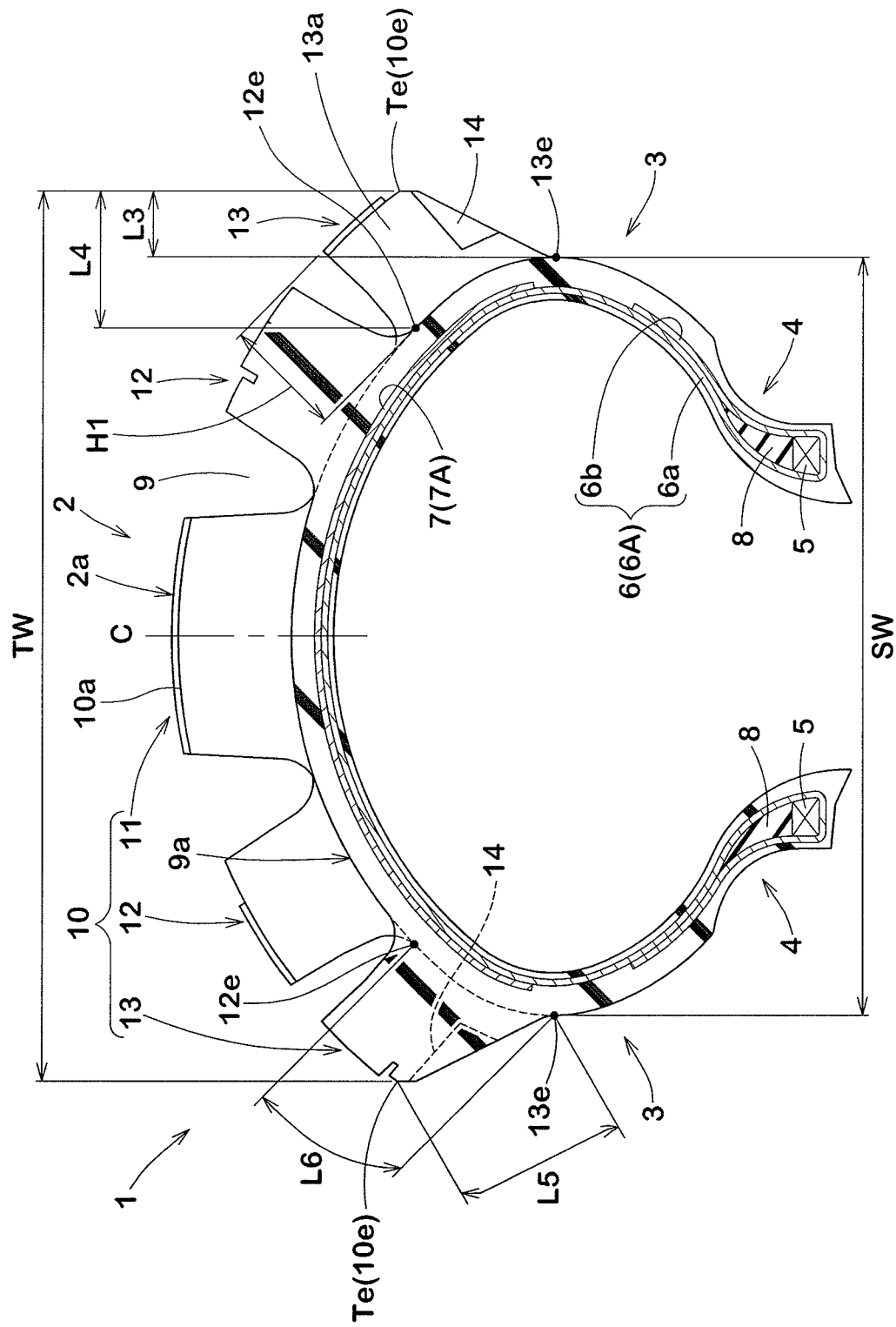
FIG. 1 is a cross-sectional view of a tyre in accordance with an embodiment of the disclosure.
Figure 2:
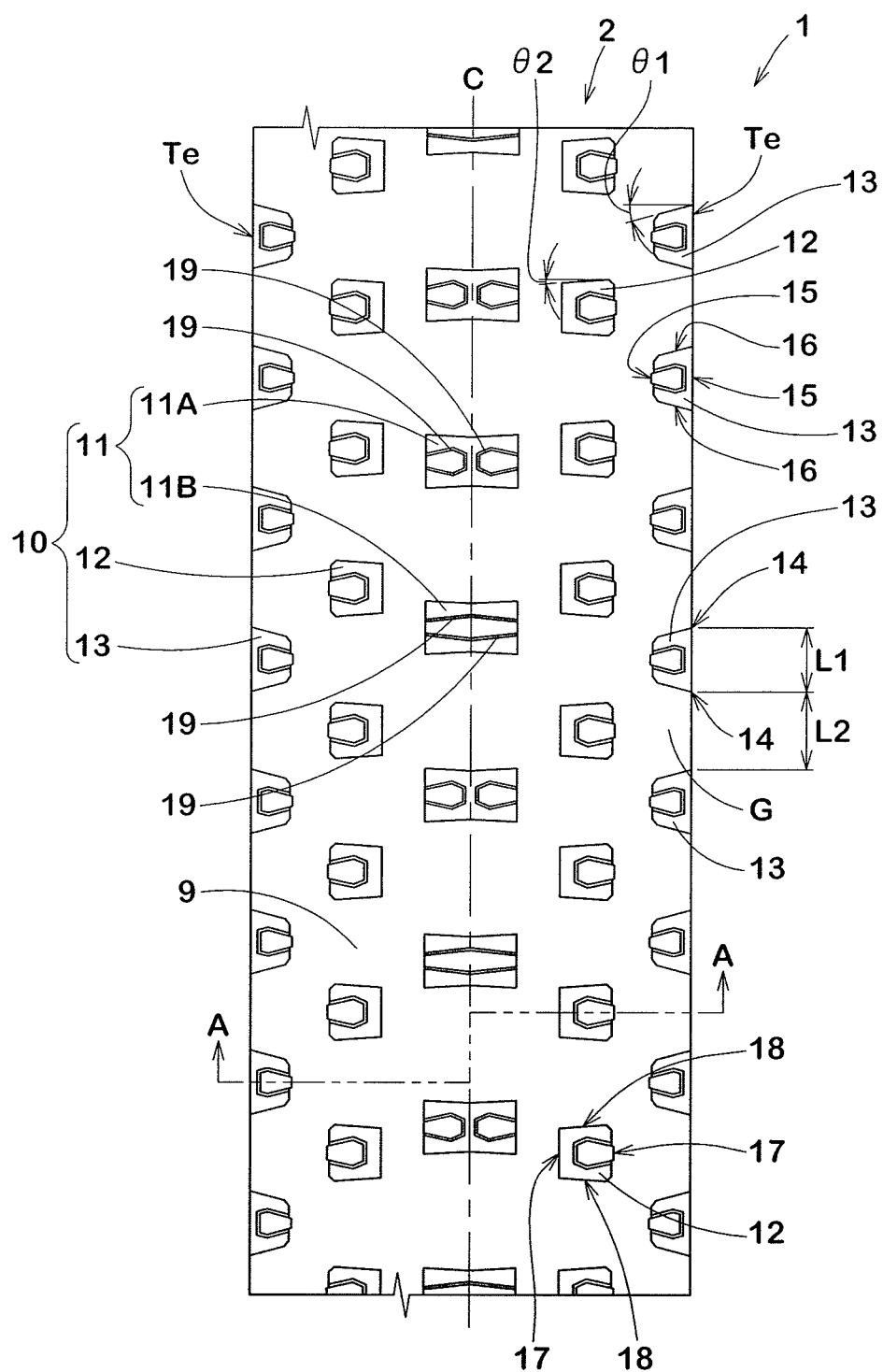
FIG. 2 is a development view of a tread portion of FIG. 1.

FIG. 1 is a cross-sectional view of a tyre 1 under a standard state in accordance with an embodiment of the disclosure. FIG. 2 is a development view of a tread portion 2 of the tyre 1. FIG. 1 is a cross-section taken along line A-A of FIG. 2.

The tyre 1, for example, is suitable for mounting on a motorcycle for motocross and the like (not illustrated). Note that the tyre 1, for example, may be embodied for mounting on an automobile for running on rough terrain, e.g., a four-wheel buggy.

As used herein, the standard state is such that the tyre 1 is mounted on a standard wheel rim (not illustrated) with a standard pressure but is loaded with no tyre load. Unless otherwise noted, dimensions of respective portions of the tyre 1 are values measured under the standard state.

As used herein, the standard wheel rim is a wheel rim officially approved for each tyre by standards organizations on which the tyre 1 is based, wherein the standard wheel rim is the "standard rim" specified in JATMA, the "Design Rim" in TRA, and the "Measuring Rim" in ETRTO, for example.

As used herein, the standard pressure is a standard pressure officially approved for each tyre by standards organizations on which the tyre 1 is based, wherein the standard pressure is the "maximum air pressure" in JATMA, the maximum pressure given in the "tyre Load Limits at Various Cold Inflation Pressures" table in TRA, and the "Inflation Pressure" in ETRTO, for example.

As illustrated in FIG. 1, the tyre 1 according to the embodiment preferably includes a carcass 6 extending between bead cores 5 of bead portions 4 through the tread portion 2 and side portions 3, and a tread reinforcing layer 7 disposed radially outside the carcass 6 in the tread portion 2. Note that the side portions 3 are portions which extend in regions between the tread portion 2 and a respective one of the bead portions 4.

In this embodiment, the carcass 6 includes at least one carcass ply 6A. The carcass ply 6A includes carcass cords, preferably, oriented at angles of from 15 to 45 degrees with respect to the tyre circumferential direction. As the carcass cords, an organic fiber cord, e.g., nylon, polyester, rayon and the like can suitably be employed.

The carcass ply 6A includes a main portion 6a extending between bead cores 5 each of which is disposed in a respective one of the bead portions 4 through the tread portion 2 and the side portions 3, and a pair of turn-up portions 6b turned up around the respective bead cores 5.

Preferably, bead apex rubbers 8 are provided between the main portion 6a and the respective turn-up portions 6b. The bead apex rubbers 8, for example, are made of hard rubber compound to enhance the bead portions 4 effectively.

In this embodiment, the tread reinforcing layer 7 includes at least one reinforcing ply 7A. The reinforcing ply 7A includes reinforcing cords, preferably, oriented at angles of from 5 to 40 degrees with respect to the tyre circumferential direction. As the reinforcing cords, various cord materials, e.g., steel, aramid, rayon and the like can suitably be employed.

In this embodiment, the tread portion 2 includes a tread bottom surface 9a and one or more blocks 10 protruding radially outwardly from the tread bottom surface 9a to form grooves 9 therebetween. Preferably, the tread portion 2 is provided with a plurality of blocks 10.

In this embodiment, each block 10 includes a ground contact surface 10a forming a top surface of each block 10. Thus, each block 10 protrudes from the tread bottom surface 9a to the ground contact surface 10a.

Preferably, an outer surface 2a of the tread portion 2 is curved in an arc-shaped manner to protrude radially outwardly so that sufficient ground contact area can be obtained upon turning with large camber angles. Note that the outer surface 2a of the tread portion 2 is a surface that consists of the ground contact surfaces 10a of the blocks 10 and virtual surfaces which fill up the grooves 9 between blocks 10. In this embodiment, the tread width TW that is an axial distance between tread edges Te corresponds to the tyre-maximum width. That is, the tread width TW is greater than the tyre-section width SW that is the maximum axial distance between the side portions 3.

Here, the tread edges Te are axially outermost edges 10e of the ground contact surfaces 10a of the axially outermost blocks 10 provided on the tread portion 2 on each side of the tyre equator C. The tyre equator C is located in the middle in the tyre axial direction between the tread edges Te.

As illustrated in FIGS. 1 and 2, the blocks 10, for example, include a pair of rows of shoulder blocks 13. In this embodiment, in each row, the shoulder blocks 13 are spaced in the tyre circumferential direction and are arranged axially outermost to form the respective tread edges Te. Further, the shoulder blocks 13 each include a shoulder-end portion 3e located axially outermost on the tread bottom surface 9a.

Figure 3:
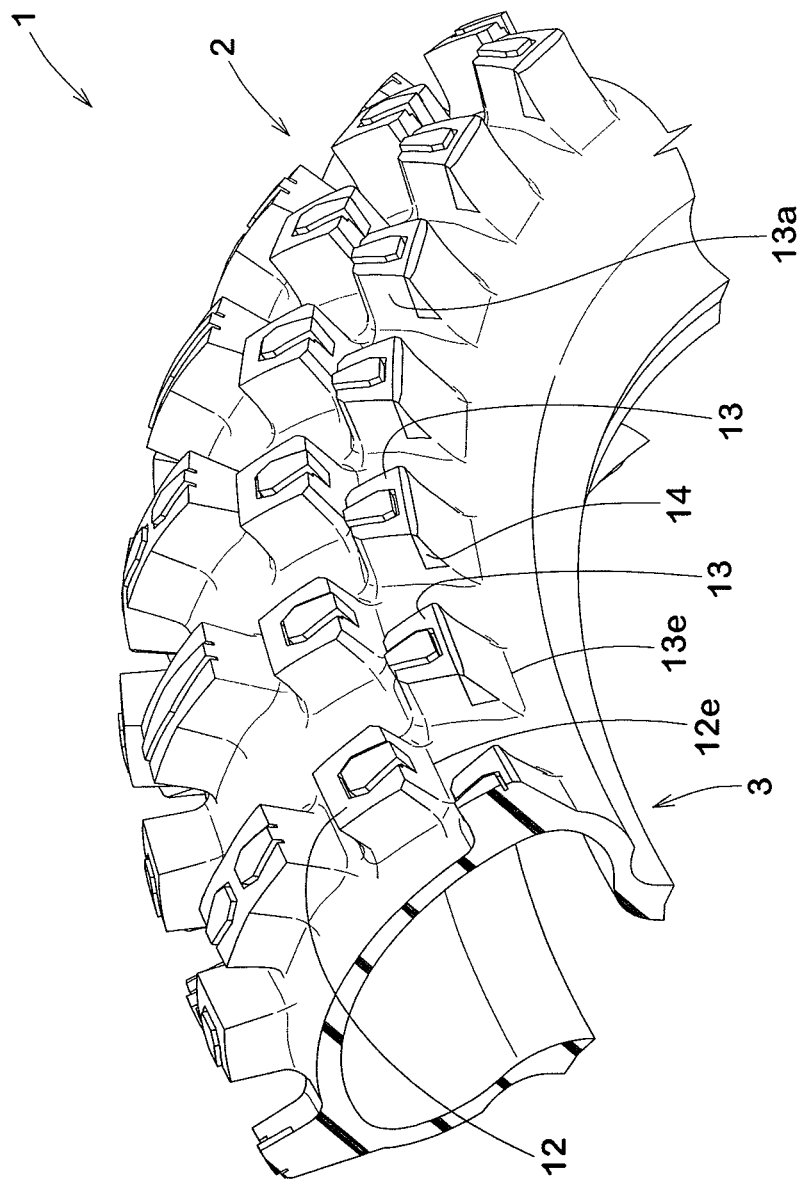
FIG. 3 is a perspective view of the tyre.

FIG. 3 illustrates a partial perspective view of the tyre 1. As illustrated in FIGS. 1 and 3, in each row, each of the shoulder blocks 13 according to the embodiment includes an overhanging portion 3a located axially outside the corresponding side portion 3. The overhanging portion 13a includes a pair of first walls 14, on circumferential both surfaces thereof, extending in substantially parallel with a tyre meridian cross-section. Preferably, each first wall 14 has an angle within 5 degrees, i.e., within plus minus 5 degrees, with respect to the tyre meridian cross-section.

As illustrated in FIGS. 2 and 3, the shoulder blocks 13 have shoulder block lengths L1 which are lengths in the tyre circumferential direction measured between the pair of first walls 14 along the ground contact surface 10a. Further, circumferential gaps G (groove sections) are provided between adjacent shoulder blocks 13 in the tyre circumferential direction. The gaps G have gap lengths L2 which are lengths in the tyre circumferential direction measured on the tread bottom surface 9a between adjacent shoulder blocks 13. In this embodiment, the shoulder block lengths L1 are shorter than gap lengths L2.

Figure 4:
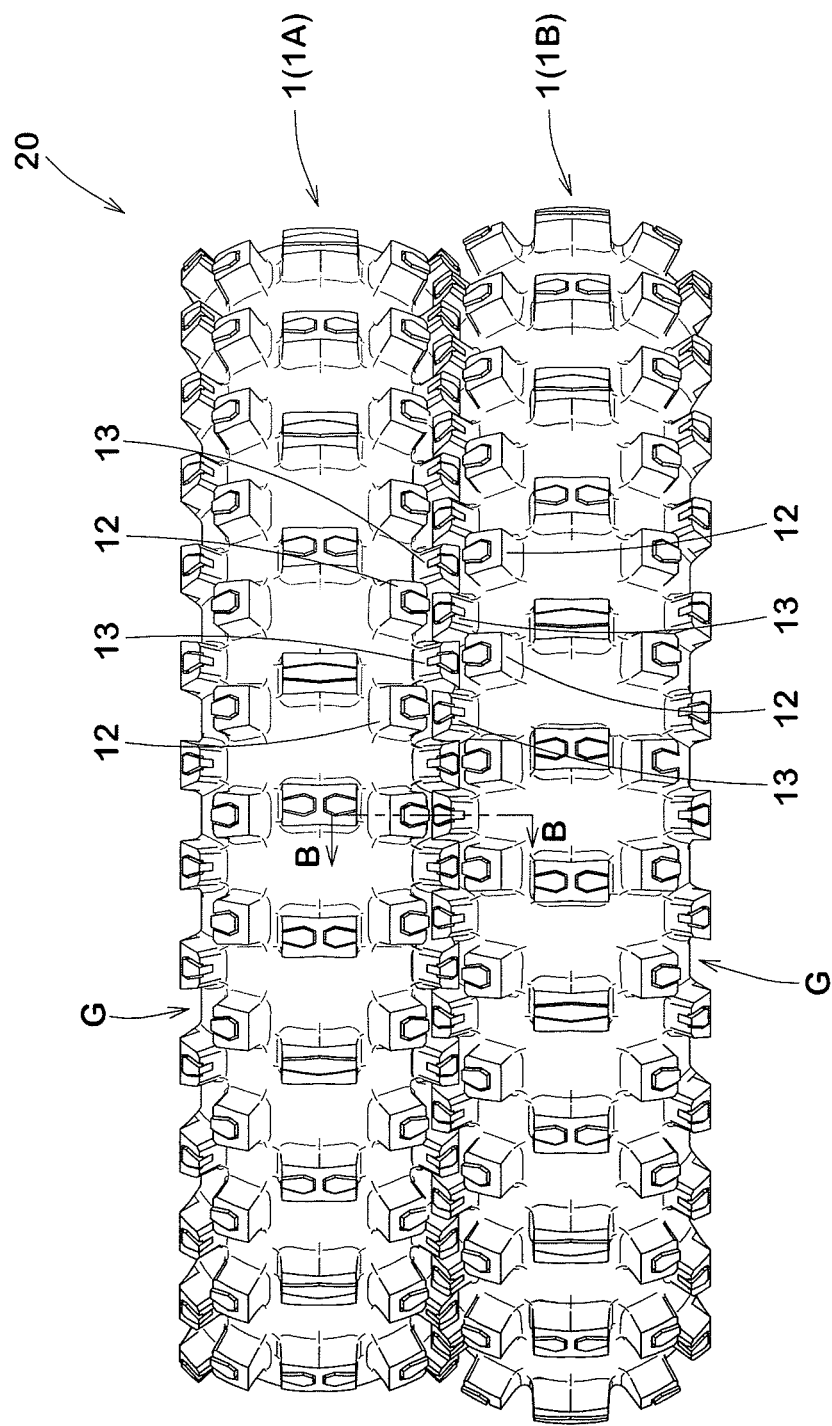
FIG. 4 is a front view of a tyre set in which a plurality of tyres is stacked.

FIG. 4 illustrates a front view of a tyre set 20 in which a plurality of tyres 1 including a first tyre 1A and a second tyre 1B are stacked. As illustrated in FIG. 4, in the embodiment, when the tyres 1A and 1B, for example, are stacked in the tyre axial direction, the shoulder blocks 13 of the first tyre 1A are positioned into the gaps between adjacent shoulder blocks 13 of the second tyre 1B, and therefore these tyres 1A and 1B can be stacked stably and smoothly. Thus, the tyre 1 according to the embodiment offers an excellent working property for stacking. Further, in the tyre set 20 in which a plurality of tyres 1 is stacked, the tyres 1A and 1B overlap with each other partially in the tyre axial direction, and thus the tyre set 20 results in the compact in vertical and saving the storage space.

Figure 5:
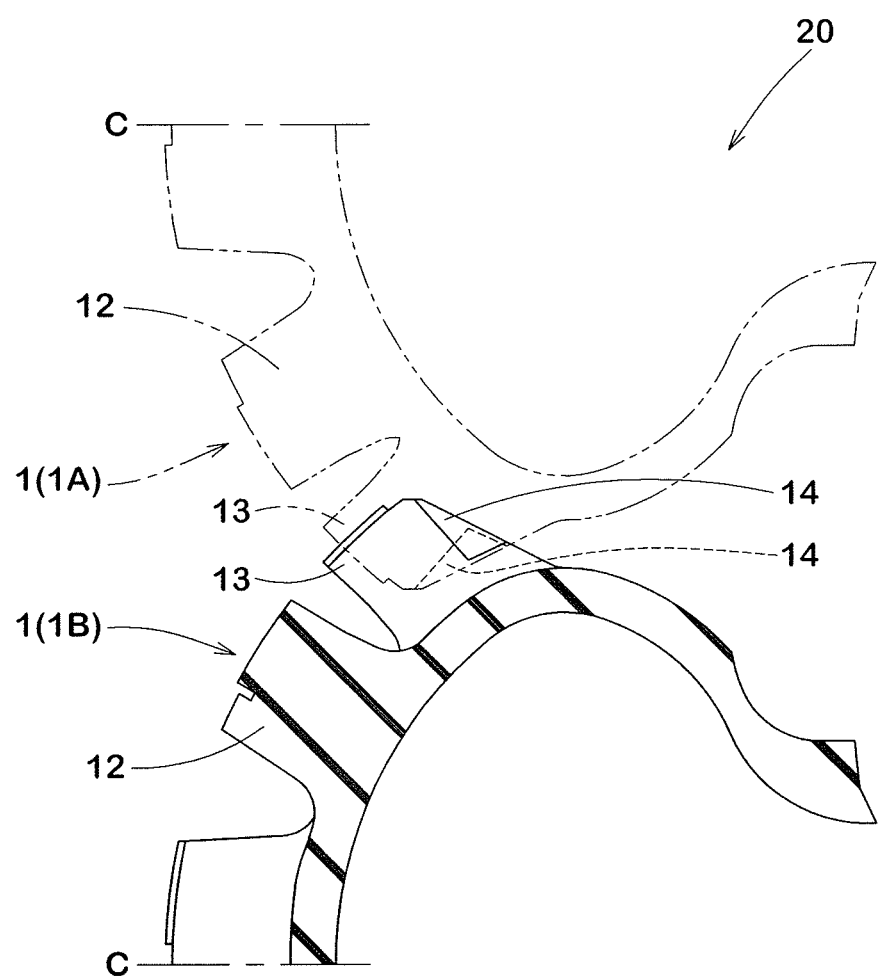
FIG. 5 is a cross-sectional view taken along line B-B of FIG. 4.

FIG. 5 illustrates a cross-sectional view taken along the line B-B in FIG. 4. As illustrated in FIG. 5, in the tyres 1A and 1B according to the embodiment, since the first walls 14 of the shoulder blocks 13 are parallel with the respective tyre meridian sections, the contact area of adjacent first and second tyres 1A and 1B on the shoulder blocks 13 becomes large when two tyres 1A and 1B are stacked. Thus, the tyre set 20 in which a plurality of tyre 1 according to the embodiment is stacked can suppress the collapse of tyres 1A and 1B even when vibration and an external force, e.g., inertial force, acts on the tyre set 20.

As illustrated in FIG. 2, the shoulder block lengths L1 are preferably in a range of from 90% to 98% of the gap lengths L2. When the shoulder block lengths L1 are less than 90% of the gap lengths L2, after two tyres 1 are stacked, the tyres 1 are prone to be moved relatively in the tyre circumferential direction since circumferential plays of the shoulder blocks 13 in the gaps G tend to be large between stacked tyres. Thus, the effect suppressing the collapse of the tyres 1 may be restrictive. On the other hand, when the shoulder block lengths L1 are more than 98% of the gap lengths L2, to place the first tyre 1A on the second tyre 1B, it may be difficult to insert each shoulder block 13 of the first tyre 1A into each gap G between adjacent shoulder blocks 13 of the second tyre 1B, resulting in deteriorating the working property for stacking.

Preferably, the ground contact surface 10a of each shoulder block 13 has a quadrilateral shape. In this embodiment, the ground contact surface 10a of each shoulder block 13 includes two longitudinal edges 15 extending in the tyre circumferential direction and two lateral edges 16 which are inclined at an angle θ1 in an opposite direction from each other with respect to the tyre axial direction. Thus, the ground contact surface 10a of each shoulder block 13 may have a substantially trapezoidal shape.

In this embodiment, one of the longitudinal edges 15 which is located axially outward of each shoulder block 13 defines the tread edges Te. As the longitudinal edges 15 of each shoulder block 13, for example, the axially outer longitudinal edges 15 is longer than the axially inner longitudinal edge 15 so that each shoulder block length L1 increases toward axially outwardly. Preferably, the angle θ1 of the lateral edges 16 is in a range of from 10 to 20 degrees with respect to the tyre axial direction. Such shoulder blocks 13, on mud terrain traveling, can help to improve turning performance by generating a counterforce toward the tyre axial direction when pushing mud away in the tyre circumferential direction.

As illustrated in FIG. 1, in each shoulder block 13, the overhanging portion 13a preferably has an axially overhang length L3 in a range of from 10% to 20% of the tread width TW. When the overhang length L3 is less than 10% of the tread width TW, a contact area of two tyres 1 when stacked is prone to be small, and thus the effect suppressing the collapse of the tyres 1 may be restrictive. When the overhang length L3 is more than 20% of the tread width TW, it may be difficult to insert each shoulder block 13 of the first tyre 1A into each gap G between adjacent shoulder blocks 13 of the second tyre 1B, resulting in deteriorating the working property for stacking.

As illustrated in FIGS. 1 and 3, the first wall 14 of each overhanging portion 13a preferably has a triangular shape. In this embodiment, each first wall 14 has a triangular shape having one vertex on or near the tread edge Te. Such a first wall 14 may be useful to ensure a sufficient contact area of two stacked tyres 1 without reducing a ground contact area of each shoulder block 13.

As illustrated in FIGS. 1 to 3, the tread portion 2, for example, is further provided with a pair of rows of middle blocks 12 arranged axially inside the pair of rows of the shoulder blocks 13, and a row of crown blocks 11 arranged between the pair of rows of middle blocks 12. In each row, the middle blocks 12 are spaced in the tyre circumferential direction. In axially adjacent rows of the shoulder blocks 13 and the middle blocks 12, the shoulder blocks 13 and the middle blocks 12 are arranged alternately in the tyre circumferential direction, i.e., arranged so as to be staggered in zigzag. The middle blocks 12 have middle-end positions 12e located axially outermost on the tread bottom surface 9a.

As illustrated in FIG. 2, the ground contact surface 10a of each middle block 12 preferably has a trapezoidal shape. In this embodiment, the ground contact surface 10a of each middle block 12 includes two longitudinal edges 17 extending in substantially parallel with respect to the tyre circumferential direction and two lateral edges 18 which are inclined at an angle θ2 in an opposite direction from each other with respect to the tyre axial direction.

As the longitudinal edges 17 of each middle block 12, for example, the axially outer longitudinal edges 17 is longer than the axially inner longitudinal edge 17 so that each middle block length increases toward axially outwardly. Preferably, the angle θ2 of the lateral edges 18 with respect to the tyre axial direction is smaller than the angle θ1 of the lateral edges 16 of each shoulder block 13. Preferably, the angle θ2 is equal to or less than 10 degrees. Such middle blocks 12 as mentioned above, on mud terrain traveling, can help to improve turning performance by generating a counterforce toward the tyre axial direction when pushing mud away in the tyre circumferential direction.

As illustrated in FIG. 1, it is preferable that axial middle-end distances L4 from the middle-end positions 12e to the tread edge Te located axially outwardly of the middle-end positions 12e are longer than shoulder block heights H1 at the middle-end positions 12e. Preferably, the axial middle-end distances L4 are in a range of from 105% to 130% of the shoulder block heights H1. Such middle blocks 12 as mentioned above may have no risk that the middle blocks 12 do not come into contact with each other when the tyres are stacked.

It is preferable that shoulder distances L5 from the shoulder-end portions 3e to the corresponding tread edge Te measured along the side surfaces of the shoulder blocks 13 are shorter than bottom distances L6 from the middle-end positions 12e to the shoulder-end portions 13e measured along the tread bottom surface 9a. Thus, when tyres 1 are stacked, there may be no risk that the middle blocks 12 of tyres 1 do not come into contact with each other.

Preferably, the shoulder distances L5 are in a range of from 80% to 95% of the bottom distances L6. In the tyres 1 having such blocks 10, when two tyres 1 are stacked, the shoulder blocks 13 of one tyre 1 engage the gaps between adjacent shoulder blocks 13 of the other tyre 1 firmly, suppressing the collapse of these tyres 1 even when an external force, e.g., inertial force and vibration, acts thereon.

As illustrated in FIG. 2, the crown blocks 11, for example, are provided on the tyre equator C. In this embodiment, the axial center positions of the crown blocks 11 are located on the tyre equator C. Preferably, each crown block 11 has a lateral long shape having an axial length greater than a circumferential length to generate a large traction.

The crown blocks 11, for example, include first crown blocks 11A and second crown blocks 11B which are different from each other in shape of narrow grooves 19 which are provided on the ground contact surfaces 10a. The first crown blocks 11A, for example, each are provided with only one narrow groove 19 on each side of the tyre equator C. The second crown blocks 11B, for example, each pare provided with only two axially extending narrow grooves blocks 11B which traverse the second crown blocks 11B completely. These crown blocks 11A and 11B can improve traction as well as durability thereof.

As illustrated in FIGS. 4 and 5, the tyre set 20 includes the first tyre 1A and the second tyre 1B which are stacked up and down such that a lower side portion of the first tyre 1A lies on an upper side portion of the second tyre 1B. In the tyre set 20, since some first walls 14 of the first tyre 1A can come into contact with some first walls 14 of the second tyre 1B, a large contact area can be obtained between the first tyre 1A and the second tyre 1B, suppressing the collapse of these tyres 1 even when an external force. e.g., inertial force and vibration, acts thereon.

When stacked, the shoulder blocks 13 of the first tyre 1A are preferably inserted into the gaps G between adjacent shoulder blocks 13 of the second tyre 1B. Similarly, when stacked, the shoulder blocks 13 of the second tyre 1B are inserted into the gaps G between adjacent shoulder blocks 13 of the first tyre 1A. Thus, the first tyre 1A and the second tyre 1B are engaged firmly with each other, suppressing the collapse of these tyres 1 even when an external force, e.g., inertial force and vibration, acts on the tyre set 20.

In this embodiment, the shoulder blocks 13 of the first tyre 1A are separated from the middle blocks 12 of the second tyre 1B in the tyre axial direction. Similarly, the middle blocks 12 of the first tyre 1A are separated from the shoulder blocks 13 of the second tyre 1B in the tyre axial direction. According to the embodiment, the tyre set 20 has no risk that the middle blocks 12 and the shoulder blocks 13 come into contact with each other.

While the particularly preferable embodiments in accordance with the present disclosure have been described in detail, the present disclosure is not limited to the illustrated embodiments but can be modified and carried out in various aspects.

Example

As example tyres, motorcycle tyres (120/80-19) for rough terrain having a basic structure as shown in FIG. 1 and a basic tread pattern as shown in FIG. 2 were prototyped based on the specification in Tables 1 and 2. As comparative example tyres (120/80-19), a tyre (Ref. 1) in which the shoulder block lengths L1 are longer than gap lengths L2, and another tyre (Ref. 2) having no first walls were also prototyped based on the specification in Table 1.

Then, compactness, in each test tyre, when a plurality of tyres is stacked, working property for stacking and stability after stacked were tested. The test methods are as follows:

Compactness Test:

In each test tyre, ten tyres were stacked up and down to form a tyre set, and then the stacking height was measured. The test results are shown in Tables 1 and 2 using an index based on Ref. 1 being 100. The larger value indicates better compactness having lower stacking height.

Working Property Test:

In each test tyre, the necessary time for stacking ten tyres up and down to form a tyre set was measured. The test results are shown in Tables 1 and 2 using an index based on Ref. 1 being 100. The smaller value indicates better working property with less working time.

Stability Test:

In each test tyre, ten tyres were stacked up and down to form a tyre set, and then the tyre set 20 was vibrated in up and down direction as well as in left and right direction using a vibrator table. After being vibrated, the deviation between the uppermost tyre and the lowermost tyre was measured. The test results are shown in Tables 1 and 2 using an index based on Ref. 1 being 100. The smaller value indicates better stability having less amount of deviation of the tyre set. The vibration condition is as follows: the frequency of 1 Hz, the amplitude of 2 to 10 mm in random, and the vibration time of one hour.

Tables 1 and 2 show the test results.

TABLE 1

| | Ref. 1 | Ref. 2 | Ex. 1 | Ex. 2 | Ex. 3 | Ex. 4 | Ex. 5 |
|---|---|---|---|---|---|---|---|
| Ratio L1/L2 of shoulder block lengths L1 to gap lengths L2 (%) | 113 | 98 | 98 | 90 | 80 | 98 | 98 |
| First walls on shoulder blocks | absence | absence | presence | presence | presence | presence | presence |
| First wall angles to tyre meridian cross section (deg.) | — | — | 0 | 0 | 0 | 5 | 10 |
| Ratio L3/TW of overhang lengths L3 to tread width TW (%) | 12 | 12 | 12 | 12 | 12 | 12 | 12 |
| Ratio L4/H1 of axial middle-end distances L4 to shoulder block heights H1 (%) | 112 | 120 | 120 | 120 | 120 | 120 | 120 |
| Ratio L5/L6 of shoulder distances L5 to bottom distances L6 (%) | 110 | 95 | 95 | 95 | 95 | 95 | 95 |
| Compactness (index) | 100 | 85 | 80 | 80 | 80 | 80 | 80 |
| Working property (index) | 100 | 110 | 80 | 75 | 70 | 85 | 90 |
| Stability (index) | 100 | 95 | 80 | 90 | 95 | 85 | 90 |

TABLE 2

| | Ex. 6 | Ex. 7 | Ex. 8 | Ex. 9 | Ex. 10 | Ex. 11 | Ex. 12 |
|---|---|---|---|---|---|---|---|
| Ratio L1/L2 of shoulder block lengths L1 to gap lengths L2 (%) | 98 | 98 | 98 | 98 | 98 | 98 | 98 |
| First walls | presence | presence | presence | presence | presence | presence | presence |
| First wall angles to tyre meridian cross section (deg.) | 0 | 0 | 0 | 0 | 0 | 0 | 0 |
| Ratio L3/TW of overhang lengths L3 to tread width TW (%) | 5 | 25 | 12 | 12 | 12 | 12 | 12 |
| Ratio L4/H1 of axial middle-end distances L4 to shoulder block heights H1 (%) | 120 | 120 | 100 | 135 | 120 | 120 | 120 |
| Ratio L5/L6 of shoulder distances L5 to bottom distances L6 (%) | 95 | 95 | 95 | 95 | 75 | 80 | 100 |
| Compactness (index) | 80 | 90 | 80 | 90 | 80 | 80 | 85 |

TABLE 2-continued

|  | Ex. 6 | Ex. 7 | Ex. 8 | Ex. 9 | Ex. 10 | Ex. 11 | Ex. 12 |
|---|---|---|---|---|---|---|---|
| Working property (index) | 80 | 90 | 90 | 80 | 80 | 80 | 90 |
| Stability (index) | 95 | 70 | 90 | 90 | 95 | 90 | 90 |

From the test results, it is confirmed that the example tyres are superior to the comparative example tyres in working property for stacking, stability when stacked and compactness.

What is claimed is:

1. A tyre comprising:
    a tread portion being provided with blocks each protruding toward a ground contact surface thereof from a tread bottom surface, and axially spaced side portions extending from the tread portion to bead portions;
    the blocks comprising a pair of rows of shoulder blocks spaced in a tyre circumferential direction, each row being arranged on a respective one of tread edges;
    in each row, the shoulder blocks each comprising an overhanging portion located axially outside the corresponding side portion;
    the overhanging portion comprising a pair of first walls extending in substantially parallel with a tyre meridian cross-section; and
    the shoulder blocks having shoulder block lengths which are lengths in the tyre circumferential direction measured between the pair of first walls along the ground contact surface, wherein the shoulder block lengths are shorter than gap lengths which are lengths in the tyre circumferential direction measured on the tread bottom surface between adjacent shoulder blocks,
    wherein the shoulder block lengths are in a range of from 90% to 98% of the gap lengths.

2. The tyre according to claim 1, wherein the ground contact surface of each shoulder block is a trapezoidal shape.

3. The tyre according to claim 2, wherein each first wall is a triangular shape.

4. The tyre according to claim 2, wherein each first wall has an angle within 5 degrees with respect to the tyre meridian cross-section.

5. The tyre according to claim 2, wherein in each shoulder block, the overhanging portion has an axially overhang length of from 10% to 20% of a tread width measured between the tread edges in the tyre axial direction.

6. The tyre according to claim 1, wherein each first wall is a triangular shape.

7. The tyre according to claim 6, wherein each first wall has an angle within 5 degrees with respect to the tyre meridian cross-section.

8. The tyre according to claim 6, wherein in each shoulder block, the overhanging portion has an axially overhang length of from 10% to 20% of a tread width measured between the tread edges in the tyre axial direction.

9. The tyre according to claim 1, wherein each first wall has an angle within 5 degrees with respect to the tyre meridian cross-section.

10. The tyre according to claim 9, wherein in each shoulder block, the overhanging portion has an axially overhang length of from 10% to 20% of a tread width measured between the tread edges in the tyre axial direction.

11. The tyre according to claim 1, wherein in each shoulder block, the overhanging portion has an axially overhang length of from 10% to 20% of a tread width measured between the tread edges in the tyre axial direction.

12. The tyre according to claim 1, the blocks further comprising
    a pair of rows of middle blocks spaced in a tyre circumferential direction and arranged axially inside the pair of rows of the shoulder blocks, wherein
    in axially adjacent rows of the shoulder blocks and the middle blocks, the shoulder blocks and the middle blocks are arranged alternately in the tyre circumferential direction,
    the middle blocks have middle-end positions located axially outermost on the tread bottom surface, and
    axial middle-end distances from the middle-end positions to the tread edge located axially outwardly of the middle-end positions are longer than shoulder block heights at the middle-end positions.

13. The tyre according to claim 12, wherein
    in each row of the shoulder blocks, the shoulder blocks have shoulder-end positions located axially outermost on the tread bottom surface, and
    shoulder distances from the shoulder-end portions to the corresponding tread edge measured along side surfaces of the shoulder blocks are shorter than bottom distances from the middle-end positions to the shoulder-end portions measured on the tread bottom surface.

14. The tyre according to claim 13, wherein
    the shoulder distances are in a range of from 80% to 95% of the bottom distances.

15. A tyre set comprising:
    a first tyre and a second tyre each according to claim 12,
    when the first tyre is stacked on the second tyre such that one of the side portions of the first tyre lies on one of the side portions of the second tyre, the respective shoulder blocks of the first tyre are positioned into the respective gaps between adjacent shoulder blocks of the second tyre, and the respective shoulder blocks of the first tyre are positioned apart from the respective middle blocks of the second tyre in the tyre axial direction.

16. A tyre set comprising:
    a first tyre and a second tyre each according to claim 1,
    when the first tyre is stacked on the second tyre such that one of the side portions of the first tyre lies on one of the side portions of the second tyre, the respective shoulder blocks of the first tyre are positioned into the respective gaps between adjacent shoulder blocks of the second tyre.

* * * * *